United States Patent
Cherry, Jr. et al.

[11] Patent Number: 5,969,495
[45] Date of Patent: Oct. 19, 1999

[54] ACCELERATOR DEVICE FOR ELECTROMOTIVE VEHICLES

[75] Inventors: Wesley Robert Cherry, Jr., Mayfield Heights; Edward V. Leskovec, Eastlake, both of Ohio

[73] Assignees: Daewood Heavy industries Ltd., Incheon, Rep. of Korea; Daewood Heavy Industries America Corporation, Carlstadt, N.J.

[21] Appl. No.: 09/001,517

[22] Filed: Dec. 31, 1997

[51] Int. Cl.[6] ............................................. G05B 19/40
[52] U.S. Cl. .......................... 318/685; 318/551; 318/628; 604/65
[58] Field of Search ................................ 318/139, 587, 318/10, 446, 551, 685, 628, 439; 74/512, 513, 560; 200/86.5, 61.88; 180/65.1; 307/119, 112; 604/22, 28, 65, 30, 35, 19, 27

[56] References Cited

U.S. PATENT DOCUMENTS

| | | | |
|---|---|---|---|
| 4,516,063 | 5/1985 | Kaye et al. | 318/685 |
| 4,532,460 | 7/1985 | Gale et al. | 318/139 |
| 4,638,224 | 1/1987 | Gritter | 318/254 |
| 4,983,901 | 1/1991 | Lehmer | 318/685 |
| 5,268,624 | 12/1993 | Zanger | 318/551 |
| 5,342,293 | 8/1994 | Zanger | 604/22 |
| 5,385,068 | 1/1995 | White et al. | 74/512 |
| 5,416,295 | 5/1995 | White et al. | 200/96.5 |
| 5,554,894 | 9/1996 | Sepielli | 307/119 |
| 5,808,427 | 9/1998 | Worden et al. | 318/139 |

*Primary Examiner*—Paul Ip

[57] ABSTRACT

An accelerator device is used for electromotive vehicles which has an electric motor adapted to cause the vehicles to move forwards and backwards. The accelerator device includes an accelerator pedal depressible to swing between a rest position and a most depressed position. Operatively connected to the pedal is an elongated pliable strip which is slidable along a predefined moving way and carries a permanent magnet. A plurality of magnetoelectric sensors are arranged along the moving way of the strip with a substantially equal spacing from one another, each of the sensors capable of generating, when left deactivated, a pedal position signal of first logic level and activatable by the magnetic flux of the permanent magnet to produce a pedal position signal of second logic level as the permanent magnet moves over and above the respective one of the sensors. Responsive to the pedal position signals, a microprocessor is adapted to control the torque and speed of the electric motor by way of regulating the amount of electric current to be supplied to the electric motor. The magnetoelectric sensors include a Hall generator that normally gives an output voltage signal of logic level one but produces an output voltage signal of logic level zero when aligned with the permanent magnet.

18 Claims, 4 Drawing Sheets

ACCELERATOR DEVICE FOR ELECTROMOTIVE VEHICLES

FIELD OF THE INVENTION

The present invention is directed to an accelerator direction control device for electromotive vehicles which takes advantage of magnetoelectrically generated digital signals to control the direction of rotation of an electric drive motor. The invention is particularly adapted for use in an electric forklift truck employing an electric drive motor whose direction of rotation is changed by the actuation of a direction control lever but whose torque and speed varies with the swing angle of an accelerator pedal.

BACKGROUND OF THE INVENTION

Electromotive vehicles such as electric passenger cars, electric golf carts and electric forklift trucks, for instance, rely on an electric drive motor to acquire the torque needed to move forwards or backwards. Taking the electric forklift truck as an example, it employs a buttery-driven electric motor which can rotate with a controlled torque and in a controlled direction. The direction of rotation of the electric motor is controlled by a direction control lever swingably mounted on one side of a truck console. The direction control lever is hand-operated to shift between a forward position, a neutral position and a reverse position. Cooperating with the direction control lever are forward and reverse microswitches coupled to a microprocessor that, in response to the electric signals supplied from the microswitches, controls the flow of electric current to the electric motor. The forward microswitch becomes active to feed forward drive signals to the microprocessor when the direction control lever is shifted into the forward position, whereas the reverse microswitch is rendered active to feed reverse drive signals to the microprocessor if the direction control lever is swung into the reverse position. The forward and reverse microswitches remain inactive, when the direction control lever is in the neutral position, to have the microprocessor cease the electricity supply to the electric motor.

In the meantime, the acceleration of the electric motor employed in the electric forklift truck depends on the swing angle of a foot-operated accelerator pedal depressibly mounted on the floor of the forklift truck. The accelerator pedal is normally biased by a tension spring into an initial position in which the electric motor produces little or no torque. As the swing angle of the accelerator pedal grows larger, the torque produced by the electric motor is progressively increased such that the forklift truck can move at an accelerated speed. Such acceleration of the electric motor is controlled by way of detecting the variation of the pedal swing angle and regulating the amount of electric current to be supplied to the electric motor. The task of detecting the swing angle variation has heretofore been carried out either by means of photoelectric sensors which are arranged to become active one by one and to generate digital signals corresponding to the pedal swing angle, or a potentiometer which is designed to measure the electromotive forces induced by the swinging movement of the pedal and to generate analog signals corresponding to the electromotive forces. The digital or analog signals are fed to the microprocessor which in turn functions to regulate the current supply amount to the electric motor to thereby control the torque and speed of the latter.

As referred to above, the direction of rotation and the acceleration of the forklift electric motor are controlled by the microprocessor in response to the input signals fed from the microswitches associated with the direction control lever and the photoelectric sensors or the potentiometer associated with the accelerator pedal. According to the prior art accelerator device, however, a drawback is noted in that the acceleration signal generator mechanism is highly susceptible to water intrusion, water damage and bearing/seal wear, which may be a major culprit of causing failure of the accelerator device. Another shortcoming of the prior art accelerator device is that the acceleration signal generator mechanism is of costly and complicated structure mainly because it lies under the vehicle floor in a position remote from the microprocessor.

SUMMARY OF THE INVENTION

Accordingly, it is an object of the invention to provide an accelerator device for electromotive vehicles which can avoid damage or failure due to water intrusion and bearing/seal wear and which has a simplified structure manufacturable in a cost-effective manner.

In accordance with the invention, there is provided an accelerator device of the type for use in electromotive vehicles which has an electric motor adapted to cause the vehicles to move forwards and backwards. The accelerator device includes an accelerator pedal depressible to swing between a rest position and a most depressed position. Operatively connected to the pedal is an elongated pliable strip which is slidable along a predefined moving way and carries a permanent magnet. A plurality of magnetoelectric sensors are arranged along the moving way of the strip with a substantially equal spacing from one another, each of the sensors capable of generating, when left deactivated, a pedal position signal of first logic level and activatable by the magnetic flux of the permanent magnet to produce a pedal position signal of second logic level as the permanent magnet moves over and above the respective one of the sensors. Responsive to the pedal position signals, a microprocessor is adapted to control the torque and speed of the electric motor by way of regulating the amount of electric current to be supplied to the electric motor. The magnetoelectric sensors includes a Hall generator that normally gives an output voltage of logic level one but produces an output voltage of logic level zero when aligned with the permanent magnet.

BRIEF DESCRIPTION OF THE DRAWINGS

The above and other objects, features, advantages of the invention will become apparent from a review of the following detailed description of the preferred embodiment taken in conjunction with the accompanying drawings, in which.

DETAILED DESCRIPTION OF THE PREFERRED EMBODIMENT

Figure 1:
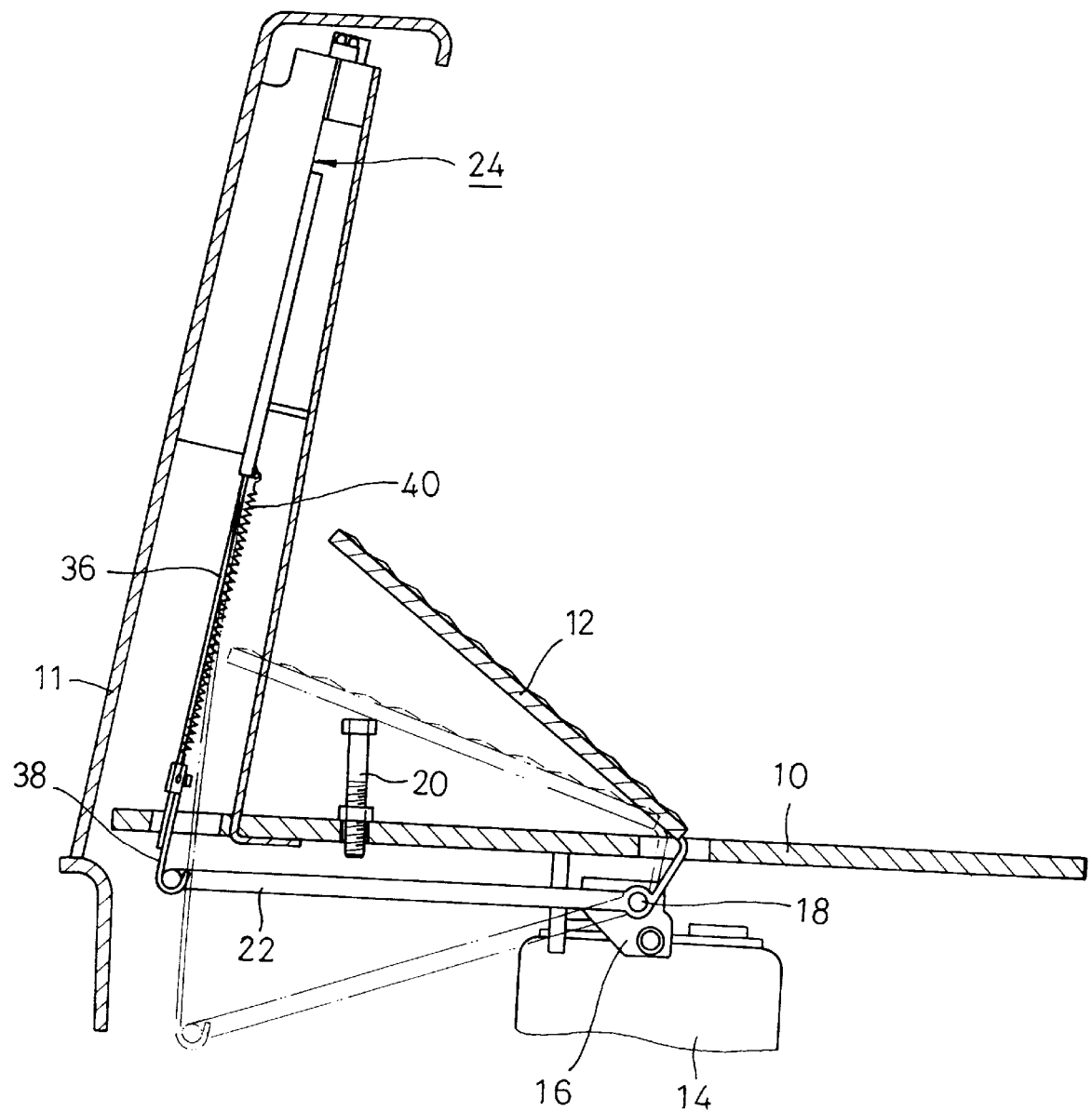
FIG. 1 is a partially sectional view showing the floor panel and the cowl of an electric forklift truck that hold in place an accelerator device in accordance with the invention, with the phantom lines indicating an accelerator pedal pressed down into a most depressed position.

It can be seen in FIG. 1 that an electromotive vehicle, e.g., electric forklift truck, includes a floor panel 10 and a cowl 11 provided in front of the floor panel 10 at an angle. Just underneath the floor panel 10, a foot-operated accelerator pedal 12 is pivotally secured to a body 14 of the forklift truck by means of a mounting bracket 16 such that it can swing about a pivot shaft 18 between a rest position as shown in a solid line and a most depressed position as illustrated in a phantom line in FIG. 1. An adjustable stopper bolt 20 is threadedly attached to and projects upwardly from the floor panel 10 to prevent the swinging movement of the accelerator pedal 12 beyond the most depressed position. Projecting frontwards from the proximal end of the accelerator pedal 12 is an actuator lever 22 of rod-like configuration which can be subjected to unitary swinging movement with the accelerator pedal 12 from a solid line position into a phantom line position.

Figure 2:
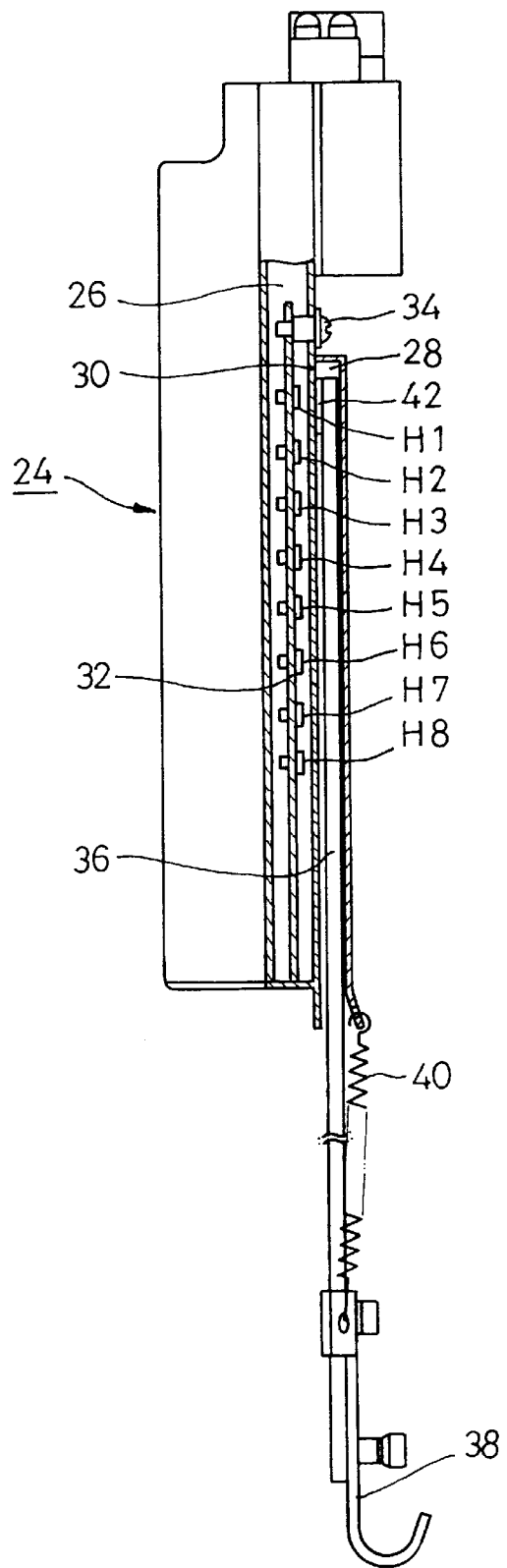
FIG. 2 is a side elevational sectional view showing a controller casing and an elongated pliable strip slidably received in the guide channel of the controller casing and carrying a permanent magnet.
Figure 3:
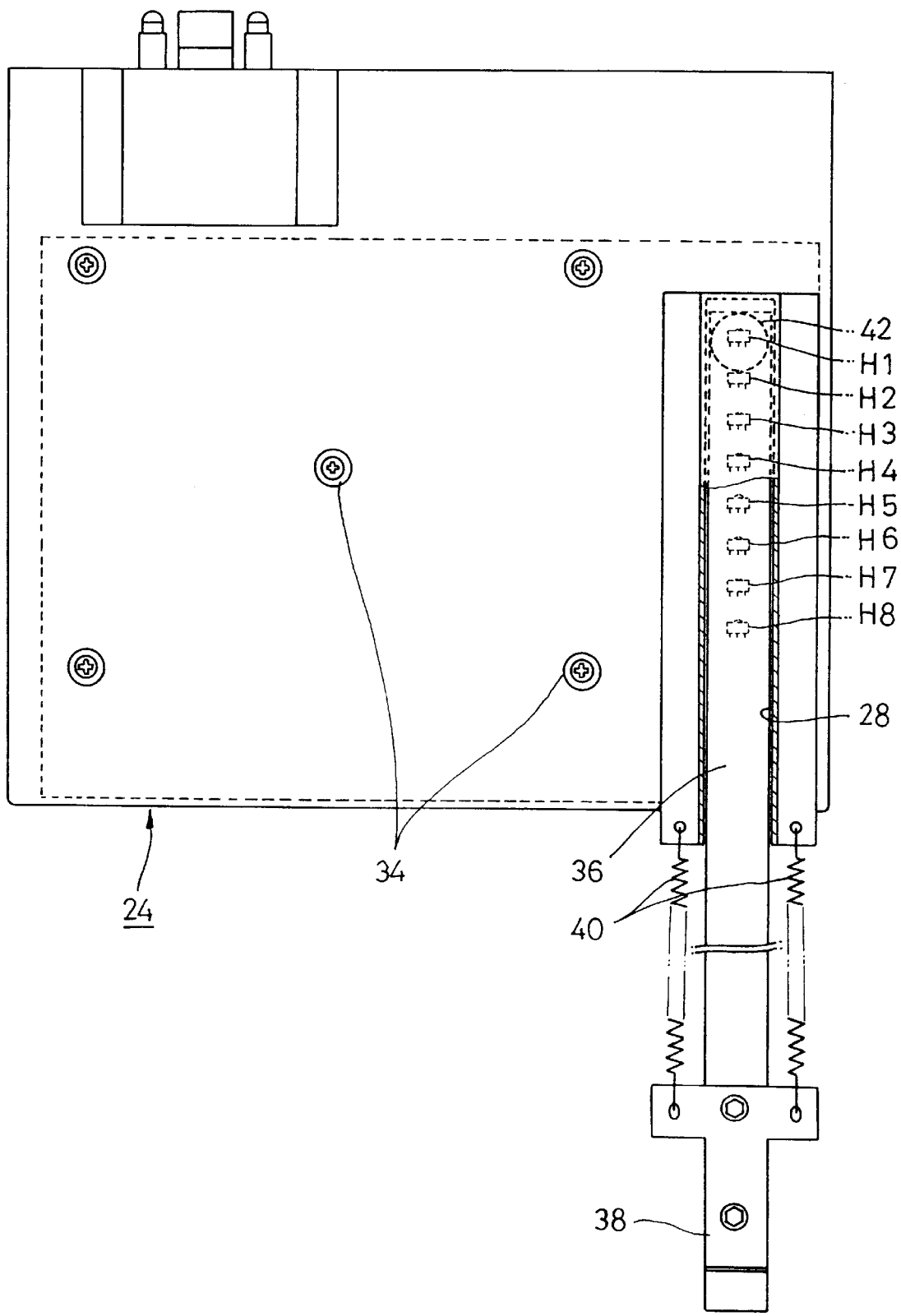
FIG. 3 is a front elevational view of the controller casing and the elongated pliable strip as illustrated in FIG. 2.
Figure 4:
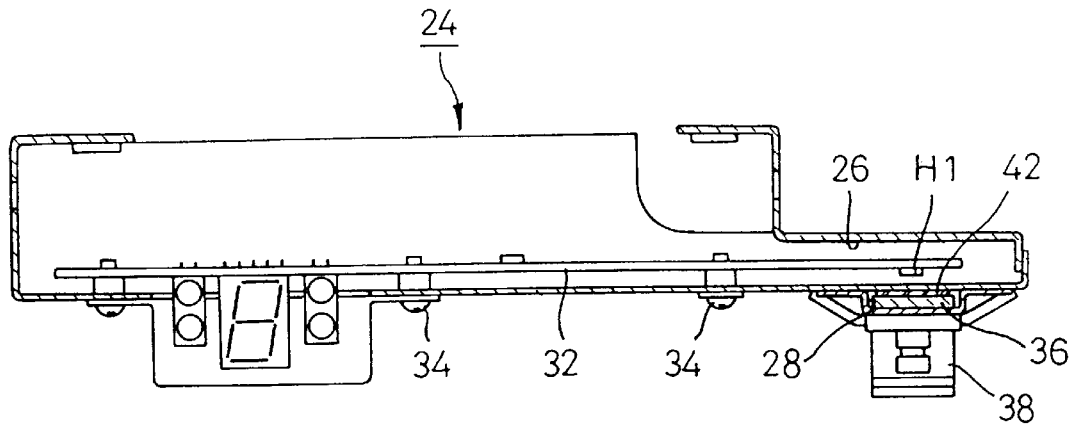
FIG. 4 is a top sectional view of the controller casing and the elongated pliable strip as depicted in FIGS. 2 and 3.

A controller casing, generally designated at 24, is fixedly attached to the inside of the cowl 11. As best illustrated in FIGS. 2, 3 and 4, the controller casing 24 has a board chamber 26 and a guide channel 28, both of which are divided and physically separated from each other by a partition wall 30. The board chamber 26 is closed at its bottom end but has a top access opening which remains sheltered by the rearwardly extending top section of the cowl 11. This assures that the board chamber 26 is free from water intrusion which would otherwise result in failure or damage of electronic components received therein. Inside the board chamber 26, a logic board 32 having a multiplicity of electronic components is removably mounted by set screws 34. Some of the electronic components of the logic board 32 are adapted to constitute a microprocessor whose function will be set forth later with reference to FIG. 5. It is preferred that the controller casing 24 should be made of anti-magnetic materials, e.g., stainless steel, so as not to disturb the flow of the magnetic flux of a permanent magnet described infra.

The guide channel 28 of the controller casing 24 has a far smaller width than the board chamber 26 and is disposed along one lateral edge of the controller casing 24, as clearly seen in FIGS. 3 and 4. Unlike the board chamber 26, the guide channel 28 is closed at its top end and opened at the bottom end thereof. At least partially inserted through the guide channel 28 and slidable along a predefined moving way is a slider, e.g., elongated pliable plastic strip 36, which has at its external end a metal hook 38 bolted thereto and engageable with the free end of the actuator lever 22 as shown only in FIG. 1.

It can be noted in FIGS. 2 and 3 that the metal hook 38 is connected to the bottom end of the controller casing 24 by a pair of tension springs 40 to ensure that the plastic strip 36 can be normally urged upwards into an upper most position and that the accelerator pedal 12 can be returned to the rest position immediately when a depressing force is removed therefrom. A sensor activator, e.g., permanent magnet 42, of generally disk shape is affixed to the top end of the plastic strip 36 so as to face the logic board 32 and to move along the guide channel 28 in unison with the plastic strip 36.

First through eighth magnetoelectric pedal position sensors, e.g., Hall generators H1, H2, H3, H4, H5, H6, H7 and H8, are affixed to the logic board 32 with a substantially equal spacing from one another. The Hall generators H1 through H8 are arranged on the logic board 32 in alignment with the guide channel 28, namely, along the predefined moving way of the plastic strip 36 and the permanent magnet 42 such that, as the magnet 42 traverses just above and over the respective one or two of the Hall generators H1 through H8, the corresponding Hall generator or generators can be activated by the magnetic flux of the permanent magnet 42 and produce an output voltage signal of logic level zero ("0") indicating the current pedal position. It should be appreciated that each of the Hall generators H1 through H8 continues to remain inactive and thereby give an output voltage signal of logic level one ("1") so long as it is out of alignment with the permanent magnet 42. The size of the magnet 42 is large enough to activate either one of the Hall generators H1 through H8 when exactly aligned therewith or two of the Hall generators H1 through H8 at a time, when it bridges over the adjoining two Hall generators.

Figure 5:
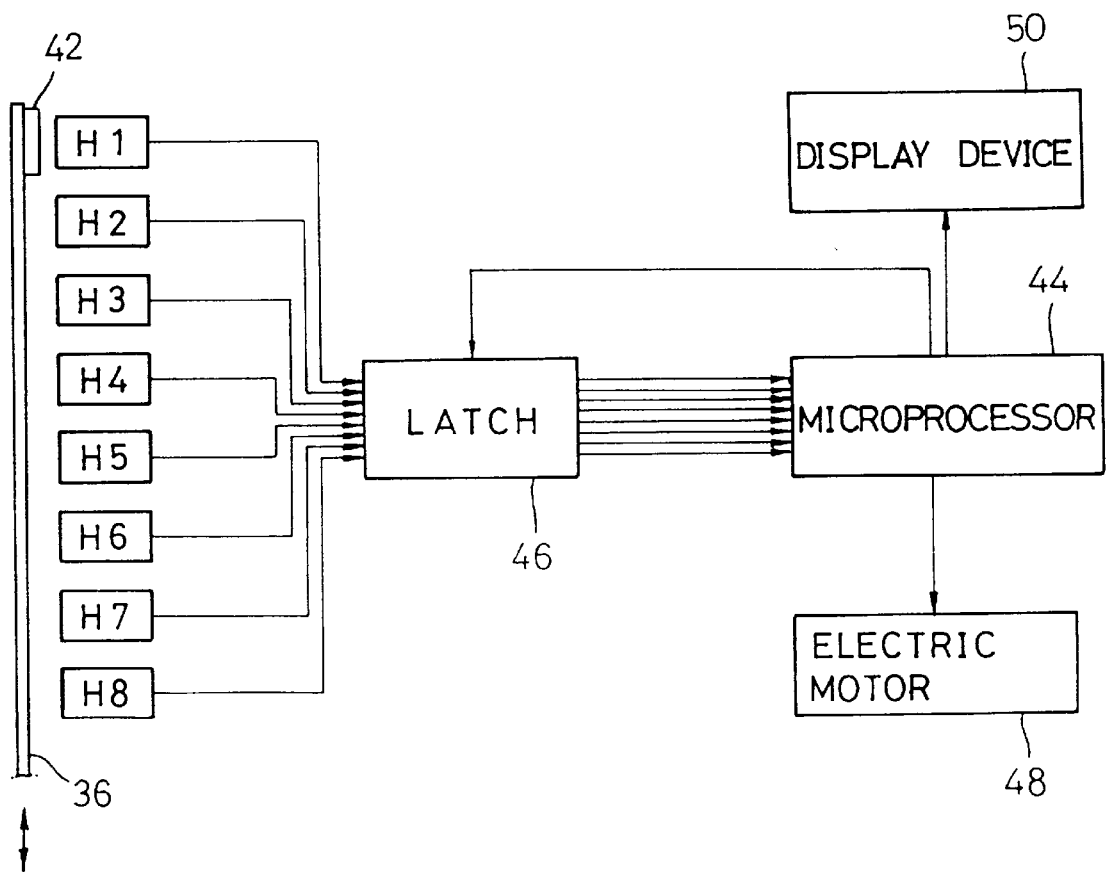
FIG. 5 is a block diagram showing the electronic circuit employed in the present accelerator device to control the torque and speed of the electric motor.

Turning now to FIG. 5, there is shown a block diagram in which a microprocessor 44 is coupled to the Hall generators H1 through H8 via a latch 46 to process the pedal position signals generated by the Hall generators and then control the torque and speed of the electric motor 48 based on the pedal position signals. The latch 46 serves to temporarily store the pedal position signals and, when enabled, to pass the stored signals to the microprocessor 44. The microprocessor 44 is designed to determine an acceleration value through the use of the pedal position signals received from the Hall generators H1 through H8. Depending on the magnitude of the acceleration value, the microprocessor 44 regulates the amount of electric current to be supplied to an electric motor 48, thus assuring proper control of the torque and speed of the electric motor 48 in proportion to the swing angle of the accelerator pedal 12.

Operation of the present accelerator device for electromotive vehicles will be described below in detail. In the event that no depressing force is applied to the accelerator pedal 12, the latter is kept in the rest position with the permanent magnet 42 of the plastic strip 36 placed in the upper most position by the biasing force of the tension springs 40. This means that the permanent magnet 42 is in alignment with the first Hall generator H1 as shown in FIGS. 2, 3 and 5, thereby activating the first Hall generator H1 so as to generate an output voltage signal of logic level zero, while the remaining Hall generators H2 through H8 are left inactive to produce output voltage signals of logic level one, as illustrated in Table 1 below. The signals thus obtained are applied via the latch 46 to the microprocessor 44 which in turn determines the acceleration value to be zero and cuts off the electric current fed to the electric motor 48 whereby the motor 48 stops rotation.

TABLE 1

| Hall Generators | H1 | H2 | H3 | H4 | H5 | H6 | H7 | H8 | Accel. Value |
|---|---|---|---|---|---|---|---|---|---|
| | 0 | 1 | 1 | 1 | 1 | 1 | 1 | 1 | 0 |
| | 0 | 0 | 1 | 1 | 1 | 1 | 1 | 1 | 1 |
| | 1 | 0 | 1 | 1 | 1 | 1 | 1 | 1 | 2 |
| | 1 | 0 | 0 | 1 | 1 | 1 | 1 | 1 | 3 |
| | 1 | 1 | 0 | 1 | 1 | 1 | 1 | 1 | 4 |
| | 1 | 1 | 0 | 0 | 1 | 1 | 1 | 1 | 5 |
| | 1 | 1 | 1 | 0 | 1 | 1 | 1 | 1 | 6 |
| Suganls Produced | 1 | 1 | 1 | 0 | 0 | 1 | 1 | 1 | 7 |
| | 1 | 1 | 1 | 1 | 0 | 1 | 1 | 1 | 8 |
| | 1 | 1 | 1 | 1 | 0 | 0 | 1 | 1 | 9 |
| | 1 | 1 | 1 | 1 | 1 | 0 | 1 | 1 | 10 |
| | 1 | 1 | 1 | 1 | 1 | 0 | 0 | 1 | 11 |
| | 1 | 1 | 1 | 1 | 1 | 1 | 0 | 1 | 12 |
| | 1 | 1 | 1 | 1 | 1 | 1 | 0 | 0 | 13 |
| | 1 | 1 | 1 | 1 | 1 | 1 | 1 | 0 | 14 |

If the permanent magnet 42 moves downwards by the depression of the pedal 12 and the resultant linear actuation of the plastic strip 36 into the position over the first and second Hall generators H1, H2, they become active concurrently to generate output voltage signals of logic level zero while the remaining Hall generators H3 through H8 is kept deactivated to produce output voltage signals of logic level one, as noted in Table 1 above. As a result, the microprocessor 41 makes a determination that the acceleration value is equal to one, allowing the electric motor to be supplied with a minimum level of electric current for rotation with a minimized torque and speed such that the forklift truck equipped with the electric motor 48 can move forwards or backwards.

As the swing angle of the accelerator pedal 12 increases, one or two of the second and eighth Hall generators is or are activated by the permanent magnet 42 to produce output voltage signals of logic level zero corresponding to the pedal swing angle, which leads to a gradual increment of the acceleration value up to the level of fourteen. At the fourteenth acceleration value, the electric motor 48 is supplied with the greatest amount of electric current and therefore will be caused to rotate with the maximum level of torque and speed, making it possible for the forklift truck to move fastest.

In case where no output voltage signal of logic level zero is produced from any one of the first through eighth Hall generators H1, H2, H3, H4, H5, H6, H7, H8, the microprocessor 44 will determine that there has taken place a failure of the Hall generators. Based on this determination, the microprocessor 44 prevents the electric motor 48 from further rotation by cutting off the electric current to be supplied to the electric motor 48. The failure of the Hall generators is notified to the driver through a display device 50.

Although the foregoing description is made by taking the magnetoelectrically operated Hall generators as an example of the pedal position sensors, it should be apparent to those versed in the art that other suitable sensors than the Hall generators can be employed to generate the pedal position signals of logic level zero in response to the depression of the accelerator pedal 12 and the linear actuation of the plastic strip 36. For instance, it can be envisioned that the production of the pedal position signals is accomplished by way of replacing the permanent magnet 42 with a light emitting diode and using a plurality of light receiving diodes in place of the Hall generators. It would be equally feasible to increase or reduce the number of the Hall generators to less than or more than eight. Such modification is a matter of design choice and still falls within the scope of the invention as defined in the claims.

While the invention has been shown and described with reference to a preferred embodiment, it should be apparent to one of ordinary skill in the art that many changes and modifications may be made without departing from the spirit and scope of the invention as defined in the claims.

What is claimed is:

1. An accelerator device for electromotive vehicles having an electric motor adapted to cause the vehicles to move forwards and backwards, comprising:

an accelerator pedal depressible to swing between a rest position and a most depressed position;

a slider operatively connected to the pedal and slidable along a predefined moving way, the slider carrying a sensor activator;

a plurality of sensors arranged along the moving way of the slider with a substantially equal spacing from one another, each of the sensors capable of generating, when left deactivated, a pedal position signal of first logic level and activatable by the sensor activator to produce a pedal position signal of second logic level; and means responsive to the pedal position signals of first and second logic levels for controlling the torque and speed of the electric motor.

2. The accelerator device for electromotive vehicles as recited in claim 1, wherein the slider comprises an elongated pliable strip having a first end connected to the pedal and a second end carrying the sensor activator.

3. The accelerator device for electromotive vehicles as recited in claim 2, wherein the accelerator pedal is provided with an actuator lever swingable together with the pedal and remaining engaged with the first end of the elongated strip.

4. The accelerator device for electromotive vehicles as recited in claim 1, further comprising a controller casing with a board chamber and a guide channel, the guide channel physically separated from the board chamber and slidably receiving at least a part of the slider together with the sensor activator.

5. The accelerator device for electromotive vehicles as recited in claim 4, further comprising a logic board contained in the board chamber of the controller casing.

6. The accelerator device for electromotive vehicles as recited in claim 5, wherein the plurality of sensors are disposed on the logic board along the length of the guide channel.

7. The accelerator device for electromotive vehicles as recited in claim 1, further comprising means for biasing the accelerator pedal into the rest position.

8. The accelerator device for electromotive vehicles as recited in claim 7, further comprising means for preventing the swinging movement of the accelerator pedal beyond the most depressed position.

9. The accelerator device for electromotive vehicles as recited in claim 1, wherein the sensor activator comprises a permanent magnet fixedly secured to the slider.

10. The accelerator device for electromotive vehicles as recited in claim 9, wherein the plurality of sensors comprise magnetoelectric sensors activatable by the magnetic flux of the permanent magnet.

11. The accelerator device for electromotive vehicles as recited in claim 10, wherein the magnetoelectric sensors comprise first through eighth Hall generators.

12. The accelerator device for electromotive vehicles as recited in claim 11, wherein the controlling means comprises a microprocessor capable of regulating the amount of electric current to be supplied to the electric motor depending on the pedal position signals.

13. An accelerator device for electromotive vehicles having an electric motor adapted to cause the vehicles to move forwards and backwards, comprising:

an accelerator pedal depressible to swing between a rest position and a most depressed position;

an elongated pliable strip operatively connected to the pedal and slidable along a predefined moving way, the strip carrying a permanent magnet;

a plurality of magnetoelectric sensors arranged along the moving way of the strip with a substantially equal spacing from one another, each of the sensors capable of generating, when left deactivated, a pedal position signal of first logic level and activatable by the magnetic flux of the permanent magnet to produce a pedal position signal of second logic level; and a microprocessor responsive to the pedal position signals of first and second logic levels for controlling the torque and speed of the electric motor.

14. The accelerator device for electromotive vehicles as recited in claim 13, wherein the slider comprises and elongated pliable strip having a first end connected to the pedal and a second end carrying the sensor activator.

15. The accelerator device for electromotive vehicles as recited in claim 14, wherein the accelerator pedal is provided with an actuator lever swingable together with the pedal and remaining engaged with the first end of the elongated strip.

16. The accelerator device for electromotive vehicles as recited in claim 13, further comprising means for biasing the accelerator pedal into the rest position.

17. The accelerator device for electromotive vehicles as recited in claim 16, further comprising means for preventing the swinging movement of the accelerator pedal beyond the most depressed position.

18. The accelerator device for electromotive vehicles as recited in claim 13, further comprising a display means associated with the microprocessor for displaying failure of the magnetoelectric sensors.

* * * * *